(12) United States Patent  
Naganawa et al.

(10) Patent No.: US 8,414,019 B2  
(45) Date of Patent: Apr. 9, 2013

(54) AIRBAG APPARATUS

(75) Inventors: Akitoshi Naganawa, Kiyosu (JP); Naohiko Ishiguro, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/404,342

(22) Filed: Feb. 24, 2012

(65) Prior Publication Data

US 2012/0248750 A1 Oct. 4, 2012

(30) Foreign Application Priority Data

Mar. 29, 2011 (JP) ................................. 2011-072984

(51) Int. Cl.
*B60R 21/203* (2006.01)
*B60R 21/16* (2006.01)

(52) U.S. Cl.
USPC ...................................... 280/730.1; 280/731

(58) Field of Classification Search ............... 280/730.1, 280/731, 730.2, 743.1, 729
See application file for complete search history.

(56) References Cited

U.S. PATENT DOCUMENTS

| | | | | |
|---|---|---|---|---|
| 6,913,283 B2 * | 7/2005 | Heym | ............................ | 280/732 |
| 7,549,672 B2 * | 6/2009 | Sato et al. | ................... | 280/730.2 |
| 7,914,038 B2 * | 3/2011 | Koyama et al. | ............ | 280/730.1 |
| 2006/0082114 A1 * | 4/2006 | Heym et al. | ................ | 280/743.1 |

FOREIGN PATENT DOCUMENTS

JP A-2003-170795 6/2003

* cited by examiner

*Primary Examiner* — Drew Brown
(74) *Attorney, Agent, or Firm* — Posz Law Group, PLC (57) ABSTRACT

The airbag of an airbag apparatus is provided with a slip member that is disposed on the outer surface of an occupant protection area of an airbag main body and can suppress load to an occupant by allowing the airbag main body to slide when the airbag comes in contact with the occupant while being developed and inflated. The slip member is connected to the airbag main body at both left and right edges and a rear-lower edge. In the slip member, a left connecting portion and a right connecting portion for connecting both left and right edges to the airbag main body are connected at a position before and above the center of the occupant protection area, and the rear connecting portion for connecting the rear-lower edge to the airbag main body is connected at a position rear-lower the center of the occupant protection area.

4 Claims, 11 Drawing Sheets

Fig. 11

US 8,414,019 B2

AIRBAG APPARATUS

CROSS REFERENCE TO RELATED APPLICATIONS

The present application claims priority from Japanese Patent Application No. 2011-72984 of Naganawa et al., filed on Mar. 29, 2011, the disclosure of which is hereby incorporated into the present application by reference.

BACKGROUND OF THE INVENTION

1. Field of the Invention

The present invention relates to an airbag apparatus equipped with an airbag that is folded and received in a receiving part and inflates to be able to protect the upper half of a occupant's body sitting on a seat while being developed and inflated to protrude from the receiving part by an inflation gas discharged from an inflator and flowed into the airbag. In particular, the present invention relates to an airbag apparatus equipped with an airbag having an airbag main body and a slip member disposed on the outer surface of the airbag main body.

2. Description of Related Art

In the related art, an airbag apparatus equipped with an airbag having an airbag main body and a slip member disposed on the outer surface of the airbag main body is disclosed in JP-A-2003-170795. In the airbag apparatus of the related art, the slip member, which can suppress load applied to an occupant from the airbag main body in contact with the occupant is disposed on the outer surface of the occupant protection area for protecting the occupant when completely inflating in the airbag main body. The slip member has a substantially rectangular external shape and can cover substantially the entire outer surface (rear surface) of the occupant protection area. Further, in the slip member, one side of the upper edge or the lower edge that is one edge in the longitudinal direction, or two sides of the left edge and the right edge opposite to each other in the transverse direction are connected to the airbag main body.

However, in the airbag apparatus of the related art, since the slip member is connected to the airbag main body by only one side of the upper edge or the lower edge, or two sides of the left edge and the right edge, there are the following problems.

When the slip member is connected to the airbag main body only by one side, that is, the upper edge or the lower edge, the following problem occurs. The slip member is rolled upward or sags from the airbag main body, such that it may not be sure to cover the occupant protection area of the airbag main body when the airbag main body is developing and inflating. Further, when the slip member is connected to the airbag main body by two sides, which are the left edge and the right edge, the following problem occurs. In this case, the joints of the slip member and the airbag main body are disposed throughout substantially the entire region in the longitudinal direction (up-down direction) in the airbag apparatus of the related art. Therefore, the degree of freedom in shifting (sliding) of the slip member from the airbag main body in the longitudinal direction (up-down direction) is low (small) and the slip member is difficult to shift (slide) in a large amount from the airbag main body when being in contact with the occupant. As a result, it is necessary to improve suppressing of the load of the airbag main body against the occupant. Further, it may be considered to simply make the widths of the joints small in order to increase the degree of freedom of the slip member in shifting (sliding) from the airbag main body.

However, it may be difficult to completely cover the occupant protection area of the airbag main body with the slip member, similar to when the slip member is connected to only one side of the upper edge or the lower edge, when only the widths of the joints are made small.

SUMMARY OF THE INVENTION

It is an object of the present invention to provide an airbag apparatus that can suppress an adjacent (proximate) occupant from being lifted up by an airbag main body when the airbag main body comes in contact with the adjacent occupant while being developed and inflated.

The object of the present invention can be accomplished by an airbag apparatus having the following configuration.

An airbag apparatus includes: an airbag that is folded and received in a receiving part; and an inflator that supplies an inflation gas into the airbag, in which the airbag inflates to protect the upper half of an occupant's body sitting on a seat while being developed and inflated to protrude from the receiving part by an inflation gas discharged from an inflator and flowed into the airbag, the airbag includes an airbag main body shaped a flexible bag form and a slip member disposed on the outer surface of a occupant protection area for protecting the occupant in the airbag main body, when the airbag main body is completely inflated, the slip member is made of a flexible sheet material that suppresses load applied to the occupant from the airbag main body to allow the airbag main body to slide when the airbag main body comes in contact with the occupant while being developed and inflated, the slip member is connected to the airbag main body at least three positions of both left and right edges, which are both lateral edges, and a rear-lower edge spaced apart from the head of the occupant at one edge in the longitudinal direction substantially perpendicular to the lateral direction, when the airbag main body has finished inflating, both of the left and right edges of the slip member are connected to the airbag main body by left and right connecting portions, the left connecting portion and the right connecting portion are positioned before and above the longitudinal center of the occupant protection area, the rear-lower edge of the slip member is connected to the airbag main body by a rear connecting portion, and the rear connecting portion is positioned rear-lower the longitudinal center of the occupant protection area.

In general, in an airbag apparatus, the airbag main body inflates in a spherical shape while generating tension along the outer surface when being developed and inflated. In this process, the occupant protection area that protects a occupant, when the airbag main body is completely inflated, is also bent and disposed to protrude the closest to the occupant at the substantially center in the longitudinal and transverse directions. Further, in the airbag apparatus of the present invention, the slip member disposed on the outer surface of the occupant protection area in the airbag main body is connected to the airbag main body at three positions of the left connecting portion and the right connecting portion that are both lateral edges, and an edge connecting portion at the rear-lower edge spaced apart from the head of a occupant at one edge in the longitudinal direction substantially perpendicular to the lateral direction. However, the left connecting portion and the right connecting portion are positioned before and above the longitudinal center of the occupant protection area and the edge connecting portion is positioned rear-lower the longitudinal center of the occupant protection area. That is, in the airbag apparatus of the present invention, the left connecting portion, the right connecting portion, and the edge connecting portion for connecting the slip member to the airbag main body at three position are disposed with the longitudinal center of the occupant protection area therebetween.

Therefore, in the airbag apparatus of the present invention, even though the airbag main body inflates such that the longitudinal center portion of the occupant protection area protrudes to the occupant, it is possible to suppress the slip member from shifting forward and upward from the center of the occupant protection area. That is, the center of the occupant protection area can be surely covered by the slip member, and when the airbag comes in contact with the occupant while it being developed and inflated, the slip member can be surely disposed between the occupant protection area and the occupant. Further, in the airbag apparatus of the present invention, the left connecting portion or the right connecting portion, and the edge connecting portion for connecting the slip member to the airbag main body are longitudinally (vertically) spaced from each other. The degree of freedom of longitudinal shifting of the slip member against the airbag main body is high (large), as compared with an airbag apparatus of the related art in which both left and right edges of a slip member are connected to the airbag main body substantially throughout the area in the longitudinal direction. As a result, in the airbag apparatus of the present invention, the slip member easily longitudinally shifts (slips) a lot against the airbag main body when the slip member coming in contact with the occupant. Further, in the airbag apparatus of the present invention, even though the airbag receives the head of the occupant and the head of the occupant comes in contact with the slip member while the airbag main body is developed and inflated, the front-upper edge portion of the slip member positioned before and above the head of the occupant can move slide against the airbag main body. This is because the front-upper edge corresponding to the head of the occupant in the slip member is not connected to the airbag main body. Therefore, it is possible to expand the airbag main body to come out forward and upward from the slip member being in contact with the head while suppressing the load to the head of the occupant. As a result, in the airbag apparatus of the present invention, even though the occupant comes in contact with the airbag while the airbag main body is developed and inflated, the slip member can be surely disposed between the occupant and the airbag main body. Further, in the airbag apparatus of the present invention, since the airbag main body inflates to protrude forward and upward while sliding against the slip member, it is possible to surely prevent the occupant being contact with the slip member from being pushed up by the inflation of the airbag main body. This is because the slip member can largely longitudinally move against the airbag main body without being connected to the airbag main body at the front-upper edge.

Therefore, in the airbag apparatus of the present invention, it is possible to suppress an adjacent occupant from being lifted up by the airbag main body when the airbag main body comes in contact with the adjacent occupant while being developed and inflated.

Further, in the airbag apparatus of the present invention, it is preferable that a margin is disposed in an area before and above the left connecting portion and the right connecting portion, in the slip member, when the airbag main body finished inflating, then, the margin is connected to the airbag main body at the front and upper edge while being loosed against the airbag main body such that the slip member is slidable to the airbag main body when the airbag main body is coming in contact with the occupant.

In the airbag apparatus having the configuration described above, since the front-upper edge corresponding to the head of the occupant, in the slip member, is connected to the airbag main body, an end edge of the slip member which traverses to the left and right sides is not generated in the area of the front-upper edge in the occupant protection area. Therefore, when the occupant protection area receives the occupant after the airbag main body has completely inflated, it is possible to suppress the end edge of the slip member from interfering with the occupant. Further, in the airbag apparatus having such a configuration, the slip member has the margin, such that the front-upper edge is connected to the airbag main body with the margin being loosed against the airbag main body. Therefore, it is possible to shift the portion positioned before and above the head of the occupant in the slip member against the airbag main body. That is, even though the head of the occupant comes in contact with the airbag main body while the airbag main body is developed and inflated, it is possible to expand the airbag main body to come out forward and upward from the slip member being in contact with the head while suppressing the load to the head of the occupant. Therefore, it is possible to surely suppress the occupant from being pushed upward by the inflation of the airbag main body.

In detail, the airbag apparatus of the present invention may preferably be used for an airbag apparatus for a steering wheel.

In the airbag apparatus for a steering wheel, the airbag main body has a occupant side wall that is disposed at the occupant side and forms the occupant protection area when the airbag main body is completely inflated, and a vehicle body side wall that is disposed at the steering wheel side when the airbag main body is completely inflated, in which the occupant side wall and the vehicle body side wall have the same external shape, which is a substantially circular shape, and the outer circumferential edges of the occupant side wall and the vehicle body side wall are joined. Further, the airbag main body inflates in a substantially convex lens shape of which the front/rear-left/right center is the thickest, when the airbag main body is completely inflated. However, as the slip member is connected to the occupant side wall at the left and right sides before the front-rear center of the occupant side wall, and the rear edge behind the front-rear center, it is possible to surely prevent the slip member from deviating forward while the airbag main body is developed and inflated. Therefore, it is possible to surely cover the occupant protection area of the airbag main body with the slip member.

Further, in the present invention, the front-upward direction includes any direction from the front to the upside and the rear-downward direction includes any direction from the rear to the downside.

DESCRIPTION OF THE PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Hereinafter, an embodiment of the invention is described with reference to the drawings. In the embodiment, an airbag apparatus M that is used for a steering wheel shown in FIGS. 1 and 2 is exemplified and described as an airbag apparatus.

Further, the front-rear direction, the up-down direction, and the left-right direction are determined with respect to when a steering wheel W mounted in a vehicle is operated for forward movement, in the embodiment unless otherwise noted. In detail, the direction defined up/down along the axial direction of a steering shaft SS (see FIG. 2) where a steering wheel W is fitted is the up-down direction, the direction defined forward/backward in the vehicle which is perpendicular to the axis of the steering shaft SS is the front/back direction, and the direction defined to the left and right of the vehicle which is perpendicular to the axis of the steering shaft SS is the left-right direction, thereby showing the front-back, up-down, and left-right directions.

Figure 1:
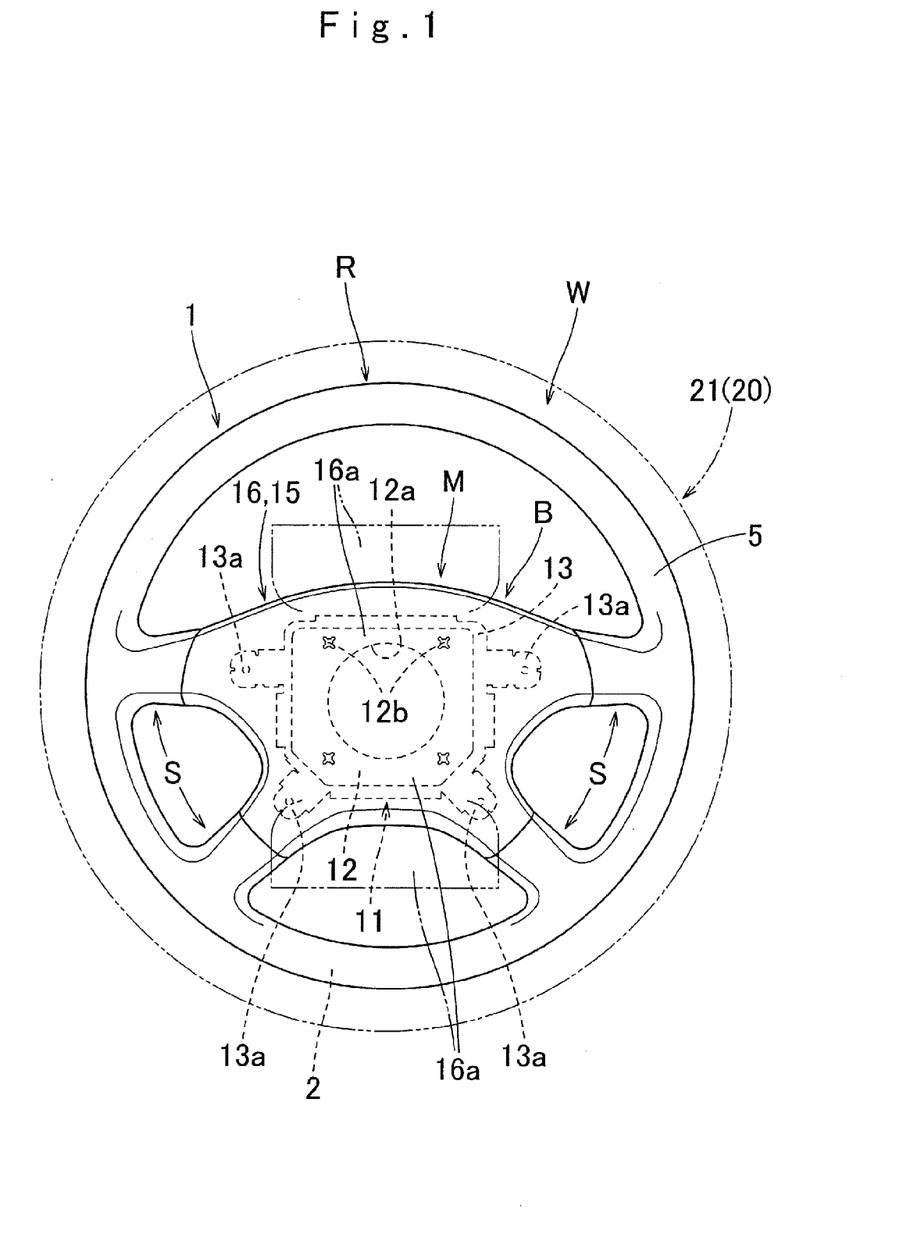
FIG. 1 is a schematic plan view showing an airbag apparatus for a steering wheel according to an embodiment of the present invention, in which an airbag that has been inflated is shown by a two-dot chain line.
Figure 2:
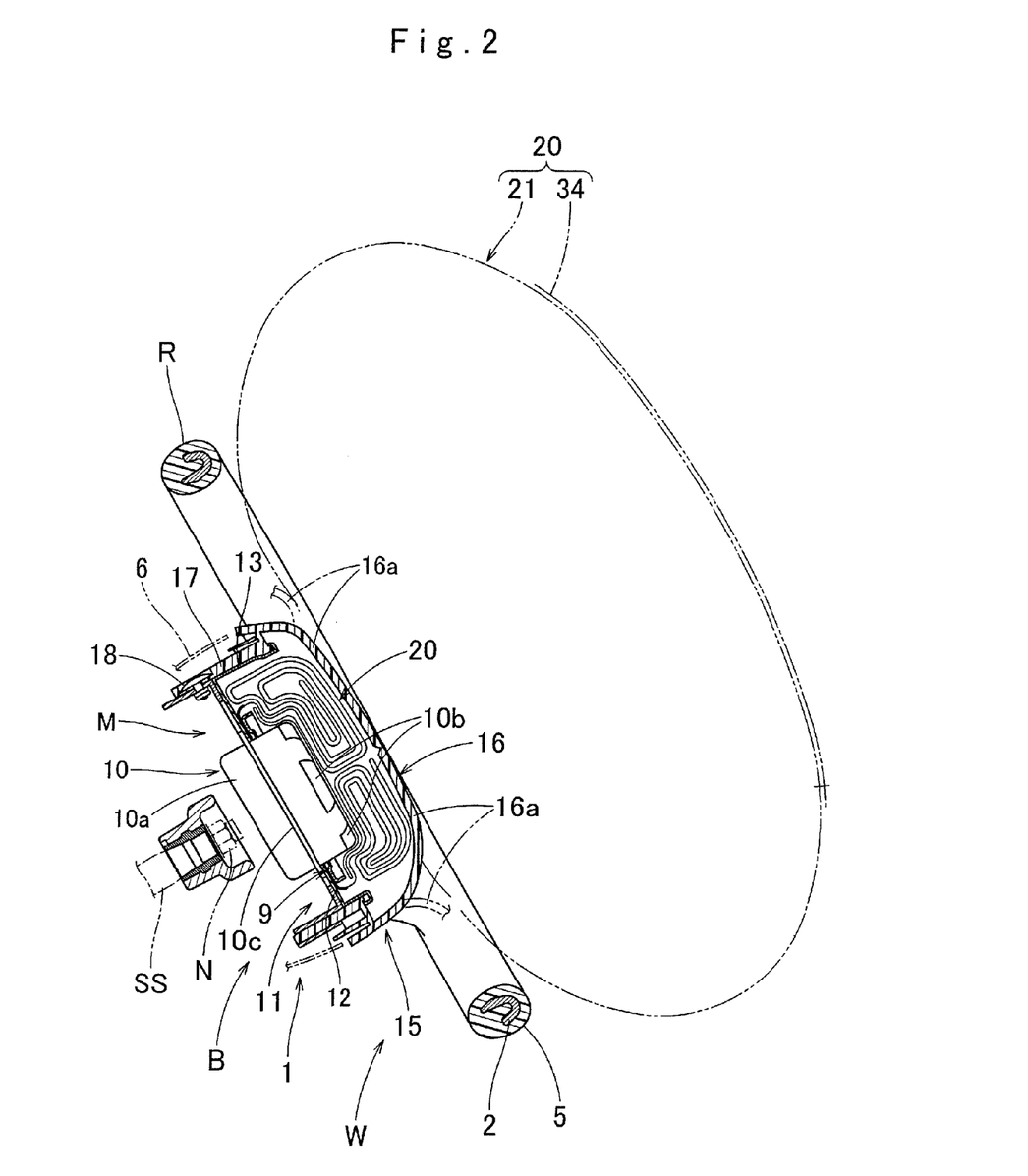
FIG. 2 is a schematic longitudinal cross-sectional view when the airbag apparatus of FIG. 1 is mounted in a vehicle, in which the airbag that has been inflated is shown by a two-dot chain line.

The steering wheel W, as shown in FIGS. 1 and 2, includes a steering wheel main body 1 and the airbag apparatus M disposed on the upper portion of a boss portion B at the center of the steering wheel main body 1, in the embodiment. The steering wheel main body 1 has a ring-shaped ring portion R that is held by hands for steering, the boss portion B disposed at substantially the center of the ring portion R, and a plurality of (four in the embodiment) spokes S connecting the boss portion B with the ring portion R. The boss portion B is a portion fastened to the steering shaft SS.

The steering wheel main body 1 includes a core 2 made of metal, such as an aluminum alloy, and a coating layer 5 that covers the outer circumference of the core 2, and a lower cover 7. The core 2, as shown in FIGS. 1 and 2, is disposed to connect the ring portion R, the boss portion B, and the spokes S. The coating layer 5, which is made of synthetic resin, is coated on the portion of the ring portion R and the portions at the ring portion R in the spokes S, in the core 2. A boss 3 made of steel for nut N stopping by inserting the steering shaft SS is disposed at the portion at the boss portion B in the core 2. The lower cover 7 is made of synthetic resin and disposed at the lower portion of the steering wheel main body 1 to cover the lower portion of the boss portion B.

The airbag apparatus M of the embodiment, as shown in FIGS. 1 and 2, is disposed at the boss portion B at the center of the steering wheel W. The airbag apparatus M includes an airbag 20 that is folded and received, an inflator 10 that supplies an inflation gas to the airbag 20, a case 11 that is a receiving portion, an airbag cover 15 that covers the upper side of the airbag 20 folded, and a retainer 9. The case 11 is a receiving portion that receives and maintains the airbag 20 and the inflator 10. The retainer 9 is a member to attach the airbag 20 and the inflator 10 to the case 11.

The retainer 9 is formed in a substantially square ring shape where a cylindrical main body 10a of the inflator 10 can be inserted from below. Bolts (not shown) which protrude downward are disposed at the four corners of the retainer 9. The retainer 9 is received in the airbag 20, with the bolts (not shown) protruding through attachment holes, which are described below, of the airbag 20. Further, the retainer 9 is nut-stopped when being mounted on the case 11, with the bolts protruding from a flange portion 10c of the inflator 10 through the bottom 12 of the case 11. As described above, the retainer 9 fixes the airbag 20 and the inflator 10 to the case 11.

The inflator 10, as shown in FIG. 2, has a main body portion 10a having a substantially cylindrical shape and a flange portion 10c protruding from the outer circumferential surface of the main body portion 10a. Gas outlets 10b for discharging the inflation gas are disposed at the upper portion of the main body portion 10a. The external shape of the flange portion 10c is a substantially rectangular plate shape. Four through-holes (not shown) are formed through the flange portion 10c. The through-holes are for passing a bolts (not shown) of the retainer 9.

The case 11 of the receiving portion is formed of a metal plate. The case 11, as shown in FIGS. 1 and 2, has a bottom 12 having a rectangular plate shape and a side wall 13 extending up/down from the outer circumferential edge of the bottom 12. An insertion hole 12a that is open in a circular shape is formed at the bottom 12, as shown in FIG. 1, and four through holes 12b are formed around the insertion hole 12a. The insertion hole 12a is for inserting the main body portion 10a of the inflator 10 from below. The through-holes 12b are for passing bolts (not shown) of the retainer 9. Mounting portions 13a extending outward are formed at the upper end of the side wall 13 (see FIG. 1). A mounting substrate of a horn switch mechanism (not shown) is mounted on each mounting portions 13a. Further, in the embodiment, the case 11 is mounted and fixed to the core 2 of the steering wheel W by the mounting substrate (not shown). Further, the airbag apparatus M is mounted on the upper portion of the boss portion B of the steering wheel main body 1 mounted on the steering shaft SS. Further, the side wall 17 of the airbag cover 15 is attached to the side wall 13 of the case 11 by rivets 18 or the like (see FIG. 2).

The airbag cover 15 is made of synthetic resin. The airbag cover 15 has a roof portion 16 covering the upper side of the airbag 20 received in the case 11 and a side wall 17 extending downward around the outer circumferential edge of the roof portion 16. The side wall 17 has a substantially rectangular cylindrical shape. Two doors 16a that are pressed by the inflating airbag 20 and opened forward and rearward are formed at the roof portion 16.

The airbag 20 has the airbag main body 21 having a flexible bag shape and a slip member 34 disposed at the outer surface of the airbag main body 21.

Figure 3:
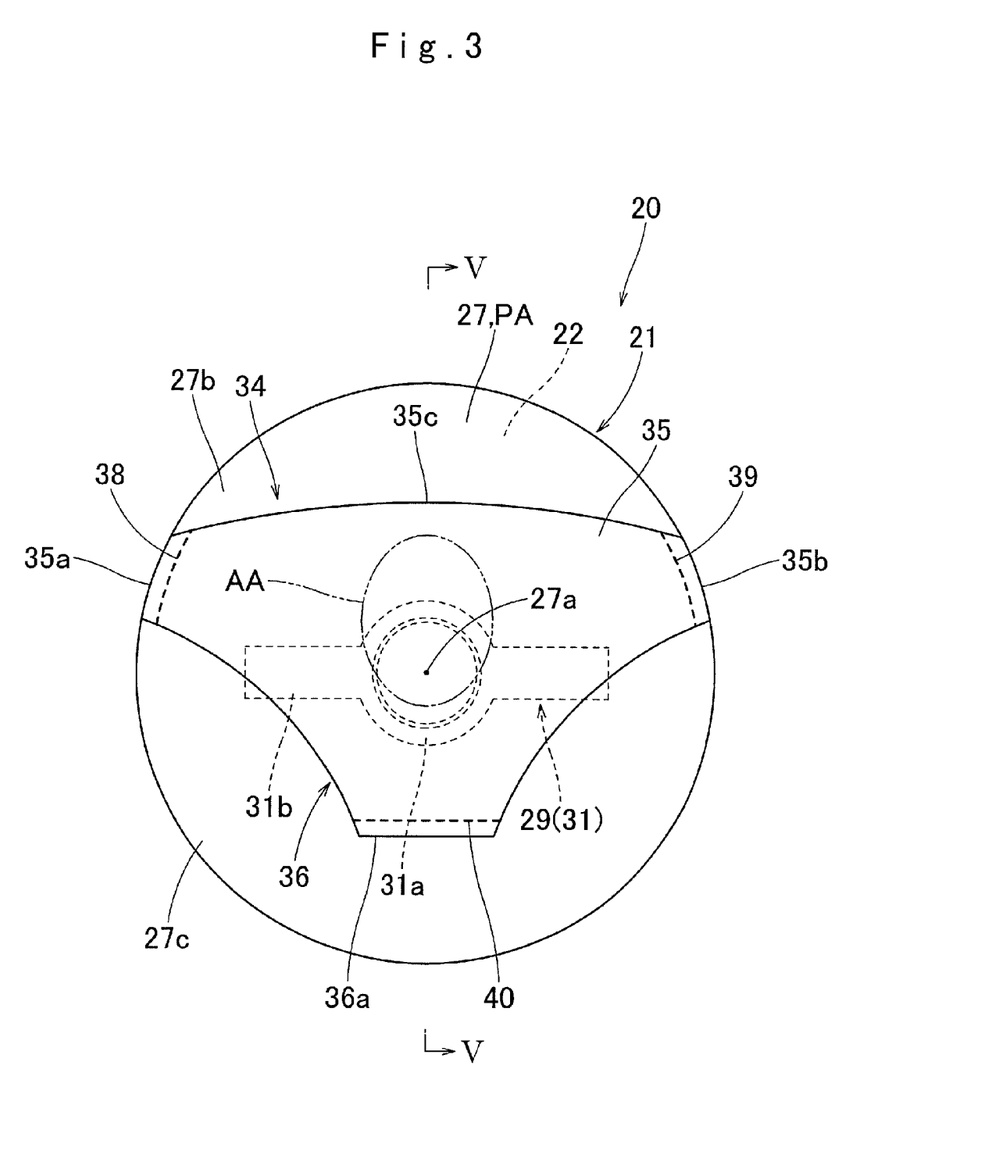
FIG. 3 is a plan view when the airbag used in the airbag apparatus of FIG. 1 is developed flat.
Figure 4:
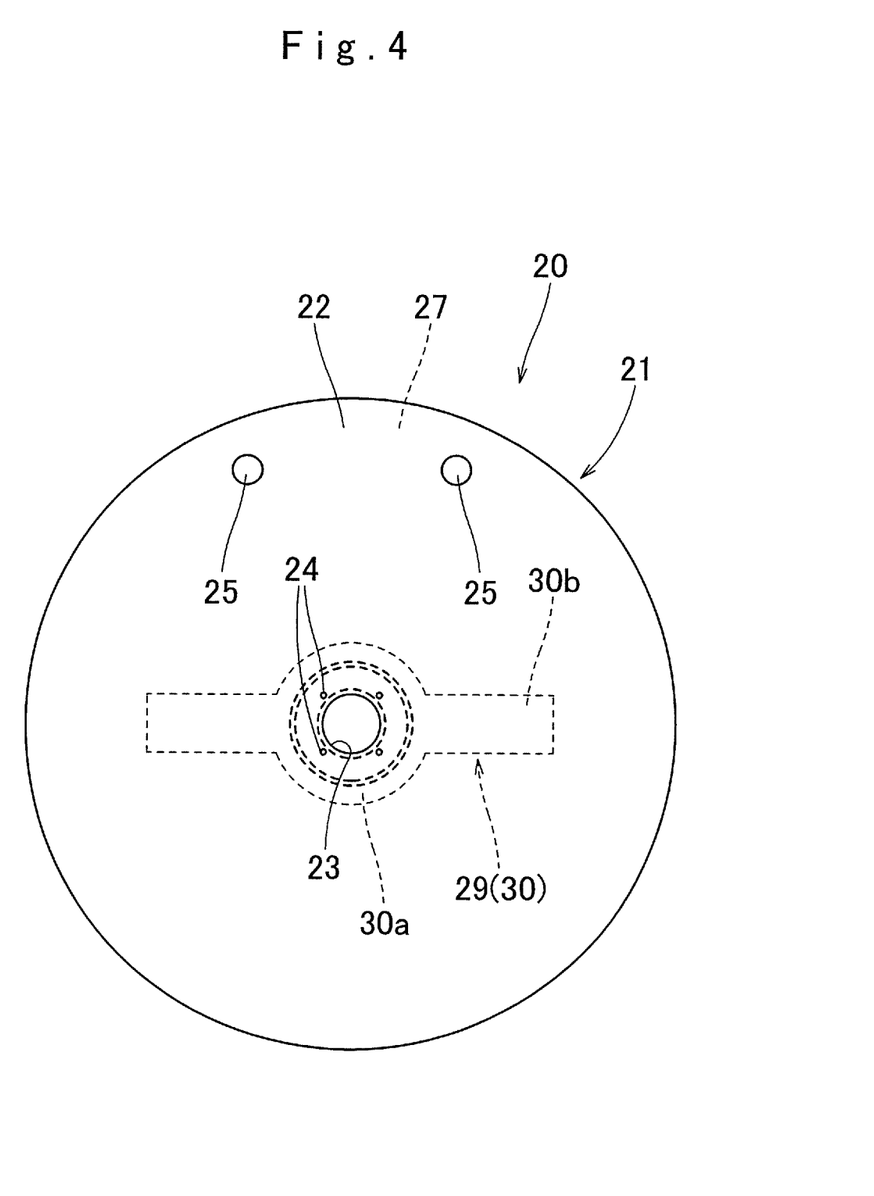
FIG. 4 is a bottom view of the airbag of FIG. 3.
Figure 5:
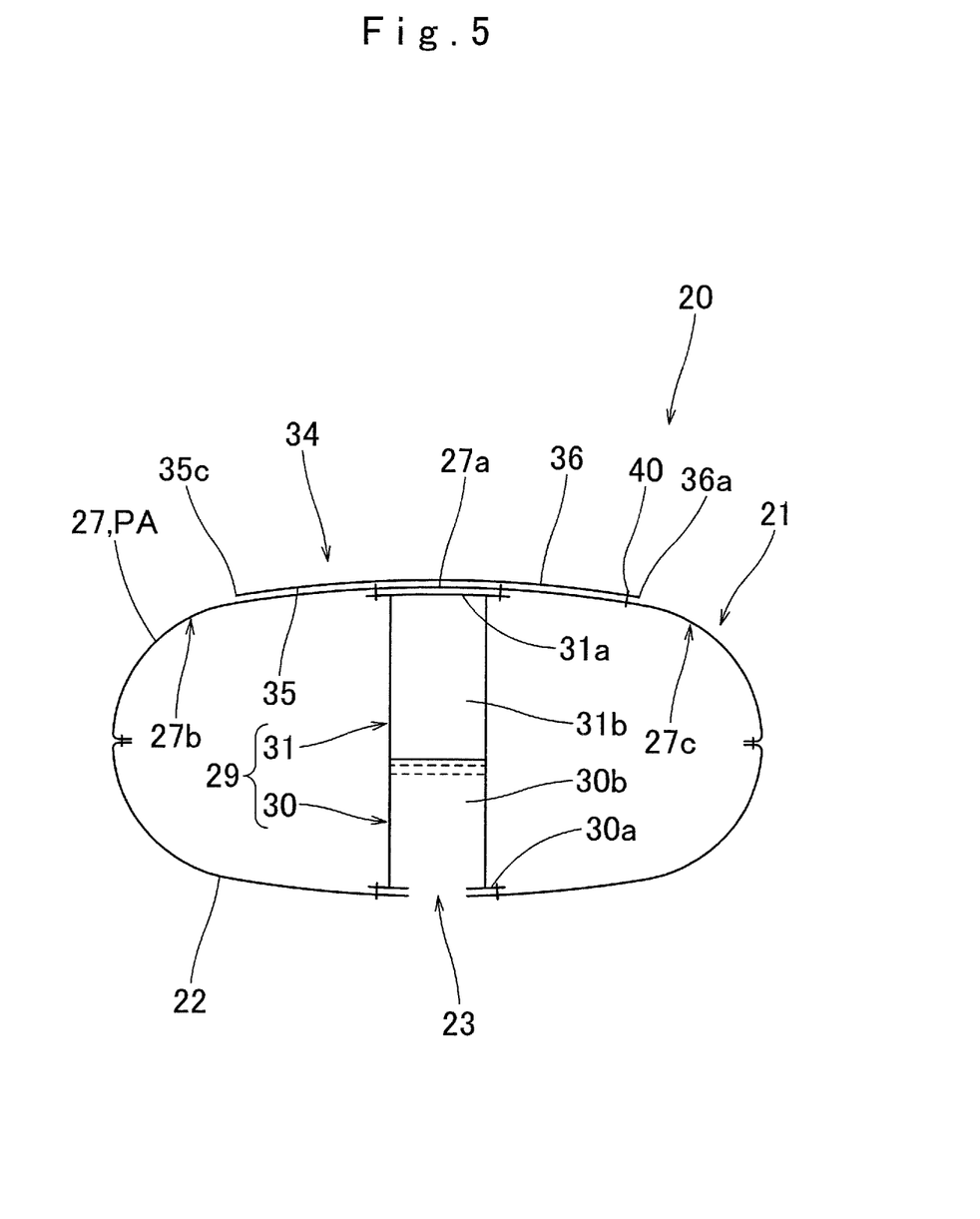
FIG. 5 is a schematic cross-sectional view taken along the line V-V when the airbag of FIG. 3 has been inflated in a single unit.

The airbag main body 21 can cover substantially the entire upper surface of the steering wheel W, as shown in FIGS. 3 to 5, when fully inflated. In detail, the airbag main body 21 has a substantially convex lens shape having a substantially circular outer circumferential edge, in which the center portion is thick and the outer circumferential edge side is thin. Further, the airbag main body 21 is formed to be able to protect the upper half body (in detail, from the chest portion to the head portion MH) of a driver MD who is an occupant sitting in a seat. In this embodiment, the airbag main body 21 has an occupant side wall 27 that has the external shape of a substantially circular shape in the same way and is disposed at a side of the occupant when the airbag 20 is completely inflated and a vehicle body side wall 22 disposed at the side of steering wheel W when the airbag 20 is completely inflated. Further, the airbag main body 21 is formed in a bag shape by sewing (connecting) the outer edges of the occupant side wall 27 and the vehicle side wall 22. In this embodiment, the airbag main body 21 is made of polyamide-based yarn or polyester-based yarn and non-coated flexible fabric cloth without being coated with a coating agent on the surface.

An inflow opening 23 is formed and opened in a circular shape through the center of the vehicle body side wall 22, as shown in FIG. 4. The inflow opening 23 is a portion that allows the main body portion 10a of the inflator 10 to be inserted from below and allows the inflation gas discharged from the gas outlets 10b of the inflator 10 to flow into the airbag main body 21. Further, four mounting holes 24 for inserting bolts (not shown) of the retainer 9 are formed at the circumferential edge of the inflow opening 23 in the vehicle body side wall 22. Further, a vent hole 25 is formed at the region ahead of the inflow opening 23, in the vehicle body side wall 22. The vent hole 25 is formed to discharge the surplus inflation gas flowing inside.

The occupant side wall 27 is a portion that forms a occupant protection area PA for protecting the driver MD who is an occupant when the airbag main body 21 is completely inflated. In detail, in the embodiment, the occupant side wall 27 protects the head MH of the driver MD at the front area 27b before the center portion (center) 27a in the front/rear and left/right (in longitudinal and transverse directions) which protrudes closest to the driver MD (upward) when the airbag main body 21 is completely inflated. Further, the occupant side wall 27 protects the chest of the driver MD at the rear area 27c behind the center 27a.

Figure 6:
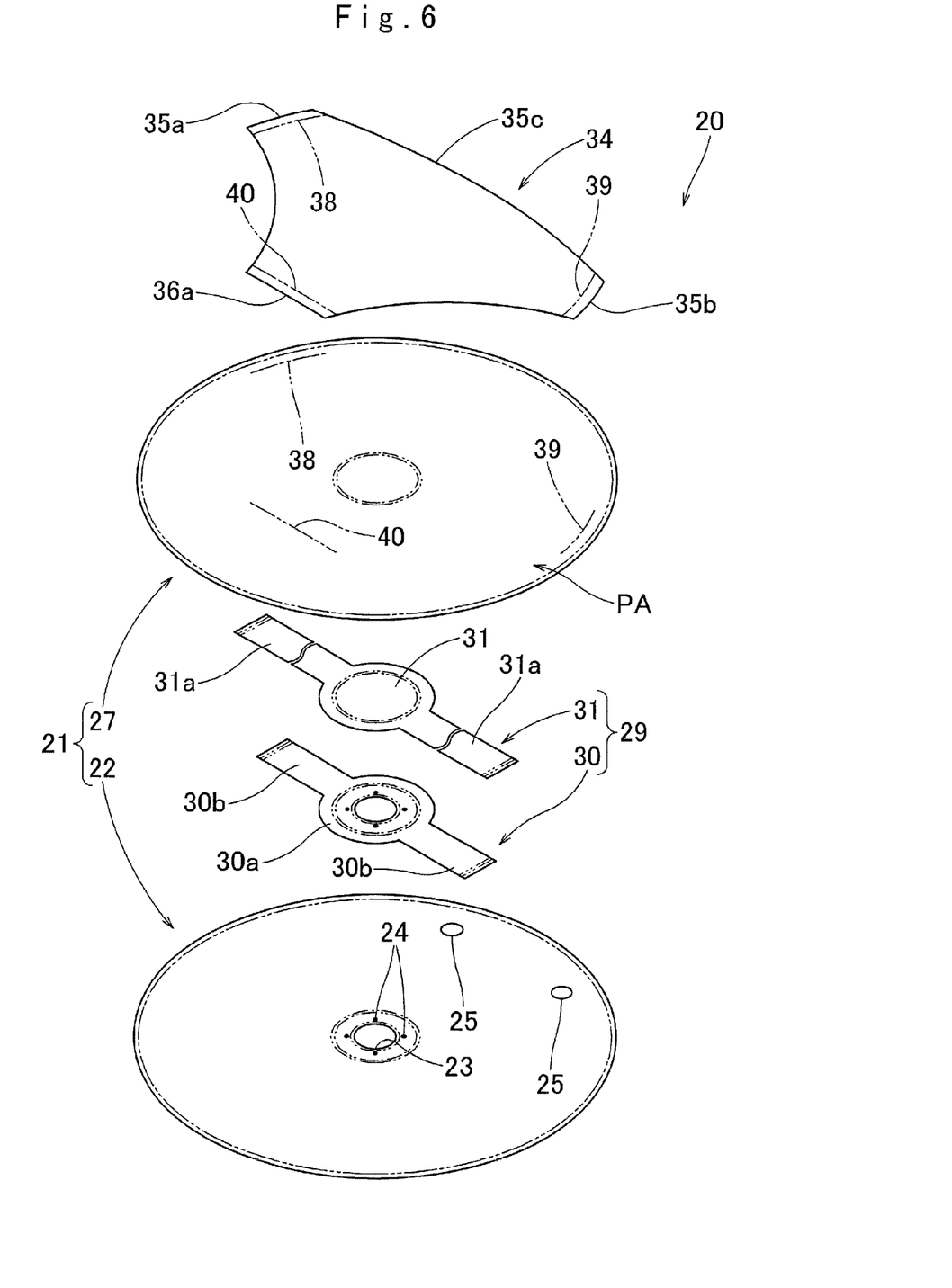
FIG. 6 is a schematic exploded perspective view showing a fabric material of the airbag of FIG. 3.

Further, a tether 29 is disposed inside the airbag main body 21 of the embodiment, as shown in FIG. 5. The tether 29 controls the gap between the vehicle body side wall 22 and the occupant side wall 27 when the airbag main body 21 is completely inflated and controls the complete inflation shape of the airbag main body 21. In the embodiment, the tether 29 has two tether fabrics 30 and 31 disposed at the vehicle body side wall 22 and the occupant side wall 27. The tether fabrics 30 and 31 are formed in substantially circular shapes include connecting portions 30a and 31a connected to the vehicle body side wall 22 and the occupant side wall 27 and stripe-shaped extending portions 30b and 31b extending from both of the left and right edges of the connecting portions 30a and 31a, respectively. Further, the tether fabrics 30 and 31 are connected to each other by sewing the ends of the extending portions 30b and 31b, thereby forming the tether 29. An opening (not provided with a reference numeral) is formed, corresponding to the inflow opening 23 and the mounting hole 24, at the connecting portion 30a of the tether fabric 30, as shown in FIG. 6.

The slip member 34 is made of a flexible sheet material. The slip member 34 is disposed at the outer surface of the occupant side wall 27 forming the occupant protection area PA. The slip member 34 is provided to suppress the load of the airbag main body 21 against the driver MD by sliding to the airbag main body 21 when the airbag main body 21 comes in contact with the driver MD while being developed and inflated. It is preferable that the slip member 34 be made of a sheet material having small friction resistance against the fabric of the airbag main body 21. In this embodiment, the slip member 34, similar to the airbag main body 21, is made of polyamide-based yarn or polyester-based yarn and non-coated flexible fabric cloth without being coated with a coating agent on the surface.

The slip member 34, in the embodiment, widens to cover the outer surface of the front area 27b from the portion of the center 27a, in the occupant side wall 27 of the occupant protection area PA. In detail, the slip member 34 has a substantially trapezoidal shape with the bottom as the front edge decreasing in width rearward, in the external shape when being developed flat. Further, in detail, the slip member 34 is disposed with the front-rear center slightly ahead of the center 27a of the occupant side wall 27. The slip member 34 has a front portion 35 and a rear portion 36. The front portion 35 is a portion covering the outer surface of the front area 27b and is shaped wide to the left and right to cover substantially the entire left and right areas, except for the front end portion of the front area 27b. The rear portion 36 extends from the rear edge of the front portion 35 to the rear region 27c of the occupant side wall 27 such that the width of the rear edge is small. In the embodiment, the slip member 34 is symmetrical left and right. Further, the slip member 34 is connected to the airbag main body 21, as follows. First, the slip member 34 is extended flat and overlapped such that the left-right center is matched with the left-right center of the occupant side wall 27, with respect to the occupant side wall 27 of the airbag main body 21 that is extended flat. Further, in the slip member 34, three positions, which are the left edge 35a and the right edge 35b that are both edges in the left-right direction (in the lateral direction) of the front portion 35, and the rear edge 36a of the rear portion 36, are sewed (connected) to the occupant side wall 27 by using sewing threads. The rear edge 36a of the rear portion 36 is one edge in the front-rear direction (longitudinal direction) which is substantially perpendicular to the left-right direction, and spaced apart from the head MH of the driver MD.

That is, in the slip member 34, the left edge 35a and the right edge 35b of the front portion 35 are sewn to the occupant side wall 27 by a left connecting portion 38 and a right connecting portion 39. Further, the rear portion 36 of the slip member 34 is sewn to the occupant side wall 27 by a rear connecting portion (edge connecting portion) 40. The left connecting portion 38 and the right connecting portion 39 are disposed ahead of the center 27a in the front-rear direction (longitudinal direction) of the occupant side wall 27 (occupant protection area PA). In detail, the left connecting portion 38 and the right connecting portion 39 are disposed behind the front-rear center of the front area 27b in the occupant side wall 27. Further, the left connecting portion 38 and the right connecting portion 39 are disposed near the outer circumferential edge of the occupant side wall 27. The rear connecting portion (edge connecting portion) 40 is disposed at a position behind the center 27a in the front-rear direction (longitudinal direction) of the occupant side wall 27 (occupant protection area PA). In detail, the rear connecting portion 40 is disposed near the front/rear-left/right center of the rear area 27c in the occupant side wall 27.

Figure 7:
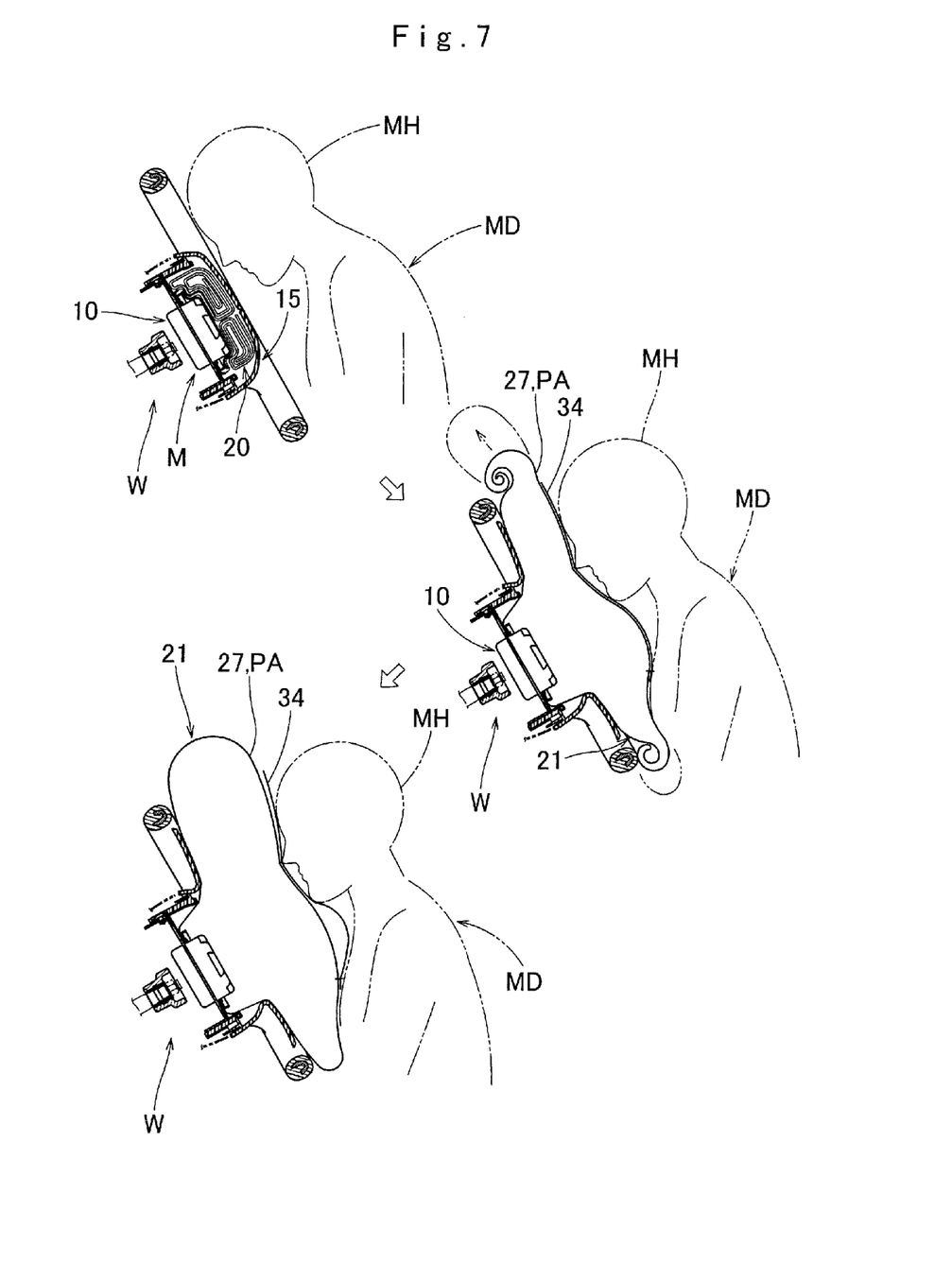
FIG. 7 is a schematic longitudinal cross-sectional view showing an inflating process of the airbag of the airbag apparatus according to the embodiment, which is mounted in a vehicle.

Further, when the airbag 20 is inflated, with the driver MD comes near to the steering wheel W (in detail, as shown in FIG. 7, with the forehead in contact with the ring portion R and the chin in contact with the airbag cover 15), the airbag 20 that is being inflated comes in contact with the driver MD. In this process, in the airbag 20 (airbag main body 21), the portion being in contact with the close driver MD is an area AA (see the two-dot chain line in FIG. 3) extending upward from the center 27a, including the center 27a of the occupant side wall 27. The slip member 34 covers the outer surface of the contact area AA of the occupant side wall 27. Further, the slip member 34 extends from the contact area AA to both left and right sides and the rear side and their ends (the left edge 35a and the right edge 35b of the front portion 35, and the rear edge 36a of the rear portion 36) are sewn to the occupant side wall 27.

Next, fabrication of the airbag 20 of the embodiment is described. The connecting portion 31a of the tether fabric 31 is sewn in advance to the inner surface of the occupant side wall 27. Similarly, the connecting portion 30a of the tether fabric 30 is sewn in advance to the inner surface of the vehicle body side wall 22. Further, the slip member 34 extended flat is overlapped on the outer surface of the occupant side wall 27 extended flat and sewn at the portions of the left edge 35a, the right edge 35b and the rear edge 36a to the occupant side wall. Next, the occupant side wall 27 and the vehicle body side wall 22 are overlapped such that the outer circumferential edges are matched with each other, when being extended flat with the outer surfaces facing each other, and the outer circumferential edges are sewn to each other. Thereafter, the vehicle side wall 22 and the occupant side wall 27 are turned by using the inflow opening 23 such that the sewn portions where the outer circumferential edges are sewn are not exposed to the outside. Next, the tether 29 is formed by taking out the extending portions 30b and 31b of the tether fabrics 30 and 31 through the inflow opening 23 and sewing the corresponding ends to each other. Accordingly, the airbag 20 can be fabricated.

Further, when the airbag 20 of the embodiment is mounted in a vehicle, the retainer 9 is inserted first into the airbag 20 such that the bolts (not shown) of the retainer 9 protrude through the mounting holes 24 of the airbag 20. Further, the airbag 20 is folded with the retainer 9 inserted therein. Thereafter, the airbag 20 folded is wrapped with a predetermined wrapping member for keeping the folded-up configuration. Further, folding of the airbag 20 is the same as in the airbag apparatus for a steering wheel in the related art. In detail, the airbag 20 is folded as follows. With the occupant side wall 27 and the vehicle body side wall 22 developed flat and overlapped on each other, first, they are folded such that the left-right width can be received in the case 11. Thereafter, the airbag 20 folded such that the left-right width is reduced is folded such that the front-rear width can be received in the case 11.

Next, the airbag 20 is received on the bottom 12 in the case 11 such that the bolts of the retainer 9 protrude from the through-holes 12b. Further, the main body portion 10a of the inflator 10 is inserted into the insertion hole 12a of the bottom 12 from below and the bolts of the retainer 9 are through the flange portion 10c and nut-stopped. Accordingly, the airbag 20 and the inflator 10 are received in the case 11, which is a receiving part, and the airbag 20 and the inflator 10 can be fixed in the case 11 by the retainer 9. Further, the case 11 is covered with an airbag cover 15, the side walls 13 and 17 are connected to each other by rivets 18 or the like, thereby fixing the airbag cover 15 to the case 11. Further, the airbag apparatus M can be assembled by mounting the horn switch mechanism (not shown) on the mounting portions 13a of the case 11. The airbag apparatus M can be mounted to a vehicle by being mounted the mounting substrate (not shown) of the horn switch mechanism to the steering wheel main body 1 fastened to the steering shaft SS in advance.

When the vehicle traveling collides with an object after the airbag apparatus M is mounted on the vehicle, the inflator 10 operates to discharge the inflation gas from the gas outlets 10b. Further, the airbag 20 is inflated by the inflation gas flowing therein and pushes and opens the doors 16a formed at the airbag cover 15. The inflated airbag 20 protrudes from the case 11, which is a receiving part, and has completely inflated, as shown by the two-dot chain lines in FIGS. 1 and 2. The external shape of the airbag 20 that has completely inflated is a substantially convex lens shape with the center portion thick and the outer circumferential edge thin. Further, the airbag 20 covers substantially the entire upper surface of the steering wheel W when inflation has finished.

In the airbag apparatus M of the embodiment, the airbag main body 21 generates tension along the outer circumference wall when being developed and inflated, and inflates in a convex lens shape close to a spherical shape. Further, in the airbag main body 21, when the airbag main body 21 is completely inflated, the occupant side wall 27 forming the occupant protection area PA is bent and disposed such that the front/rear-left/right center 27a (in the longitudinal and transverse directions) to protrude upward to be closest to the occupant. In the airbag apparatus M of the embodiment, the slip member 34 disposed on the outer surface of the occupant side wall 27 of the airbag main body 21 is connected to the airbag main body 21 at three positions of the left edge 35a and the right edge 35b that are both edges in the transverse direction (left-right direction) and the rear edge 36a spaced from the head MH of the driver MD at one edge in the front-rear direction (longitudinal direction) substantially perpendicular to the left-right direction. However, the left connecting portion 38 and the right connecting portion 39 that connect the left edge 35a and the right edge 35b of the slip member 34 to the occupant side wall 27 are disposed ahead of the front-rear center 27a of the occupant side wall 27. Further, the rear connecting portion 40 that connects the rear edge 36a of the slip member 34 to the occupant side wall 27 is disposed behind the front-rear center 27a of the occupant side wall 27. That is, in the airbag apparatus M of the embodiment, the slip member 34 is connected to the airbag main body 21 at three positions of both left and right sides and the rear side, and the left connecting portion 38, the right connecting portion 39, and the rear connecting portion 40 that connect (sew) the slip member 34 to the airbag main body 21 are disposed with the front-rear center 27a of the occupant side wall 27 therebetween.

Therefore, in the airbag apparatus M of the embodiment, it is possible to suppress the slip member 34 from deviating upward and forward from the center 27a of the occupant side wall 27, even if the airbag main body 21 is inflated such that the portion near the front-rear center 27a in the occupant side wall 27 protrudes upward to the driver MD. Further, it is possible to surely cover the center 27a of the occupant side wall 27 with the slip member 34. As a result, the slip member 34 can be surely positioned (disposed) between the occupant side wall 27 and the driver MD when the airbag 20 comes in contact with the driver MD while being developed and inflated. Further, in the airbag apparatus M of the embodiment, the left connecting portion 38 and the right connecting portion 39 that connect the slip member 34 to the airbag main body 21, and the rear connecting portion (edge connecting portion) 40 are spaced apart from each other in the front-rear direction. The degree of freedom of movement of the slip member 34 in the front rear direction against the airbag main body 21 is high (large), as compared with an airbag apparatus of the related art in which both left and right edges of a slip member are connected to the airbag main body substantially throughout the area in the longitudinal direction. As a result, the slip member 34 easily shifts a lot in the front-rear direction against the airbag main body 21, when the slip member 34 comes in contact with the driver MD. Further, in the airbag apparatus M of the embodiment, the front edge 35c of the slip member 34 which corresponds to the head MH of the driver MD is not connected to the occupant side wall 27. Therefore, the airbag 20 receives the head MH of the driver MD while the airbag main body 21 is developed and inflated, and even when the head MH of the driver MD comes in contact with the slip member 34, as shown in FIG. 7, the portion at the front edge 45c positioned ahead of the head MH of the driver MD, in the slip member 34, can be shifted against the airbag main body 21. As a result, the airbag main body 21 can be developed to come out forward against the slip member 34 being in contact with the head MH while suppressing the load against the head MH of the driver MD.

As a result, in the airbag apparatus M of the embodiment, even in the configuration of the completely inflated airbag main body 21 in which the center 27a of the occupant side wall 27 largely protrudes upward with the substantially convex lens shape, when the head MH of the driver MD is received by the airbag 20 while the airbag main body 21 is developed and inflated, the slip member 34 can be surely positioned between the head MH of the driver MD and the airbag main body 21. At this time, in the airbag apparatus M of the embodiment, since the slip member 34 can largely shift (slip) in the front-rear direction against the airbag main body 21 without the front edge being in connect to the airbag main body 21, the airbag main body 21 is inflated to protrude forward while sliding against the slip member 34. As a result, it is possible to appropriately prevent the head MH of the driver MD which is in contact with the slip member 34 from being pushed upward by the inflation of the airbag main body 21.

Accordingly, in the airbag apparatus M of the embodiment, it is possible to suppress the driver MD from being pushed upward by the airbag main body 21, when the airbag main body 21 is coming in contact with the adjacent driver MD while being developed and inflated.

Figure 8:
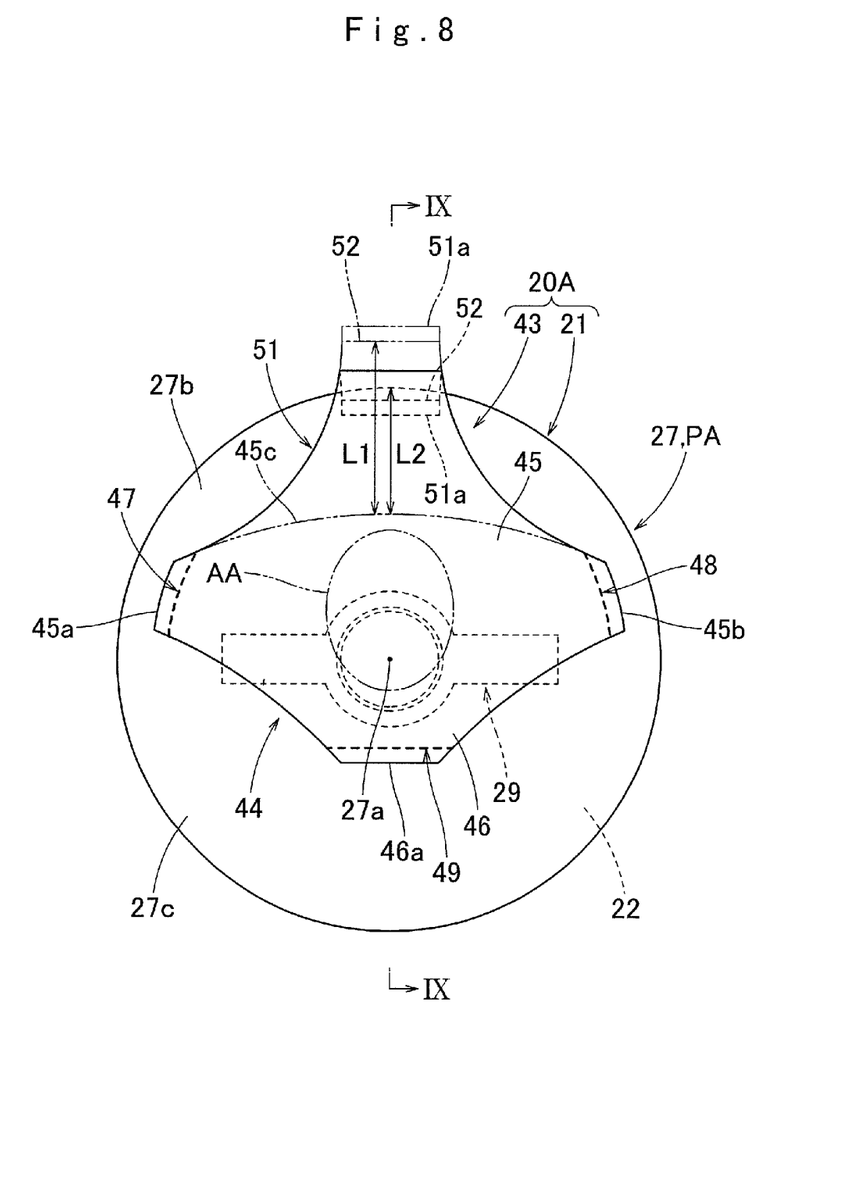
FIG. 8 is a plan view of an airbag according to another embodiment of the present invention.
Figure 9:
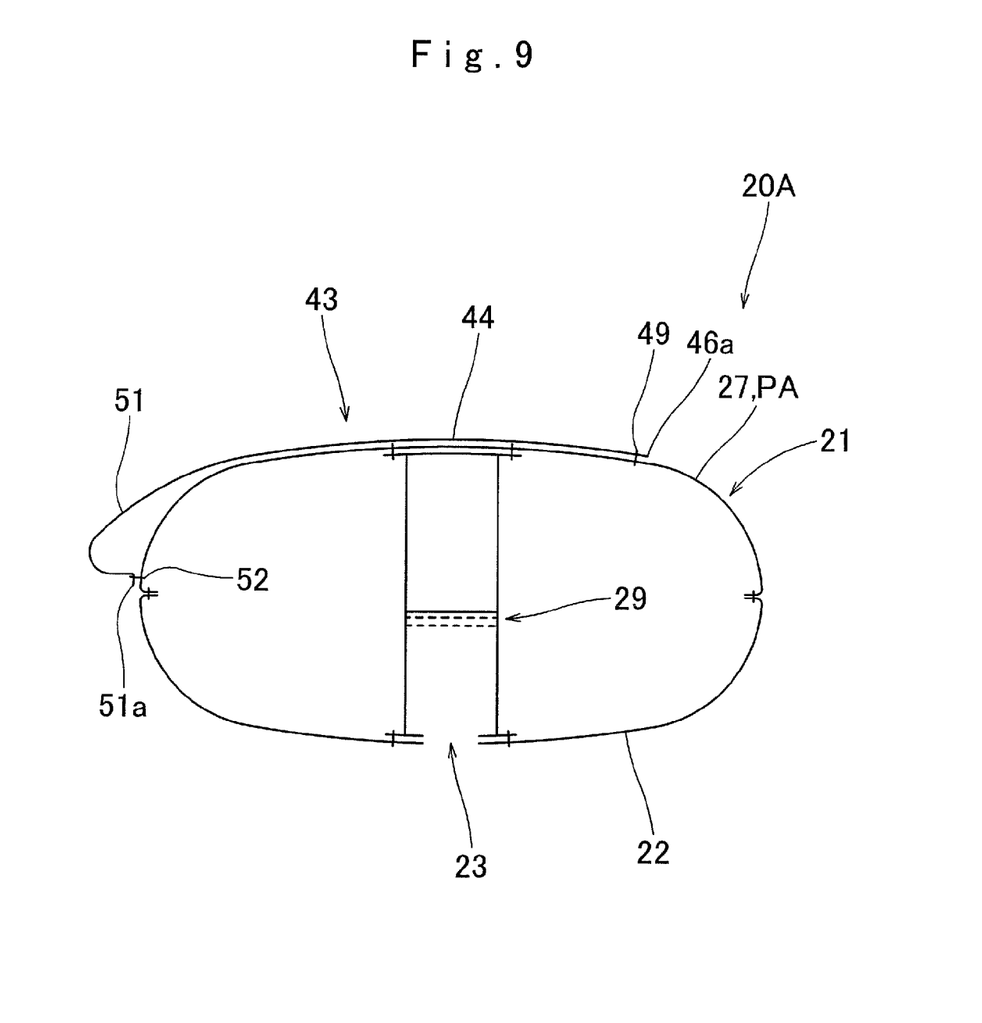
FIG. 9 is a schematic cross-sectional view taken along the line IX-IX when the airbag of FIG. 8 has been inflated in a single unit.

Further, the configuration shown in FIGS. 8 and 9 may be used as the airbag 20A. The airbag 20 shown in FIGS. 8 and 9 includes an airbag main body 21 and a slip member 43. At the airbag main body 21 has the same configuration as the airbag main body 21 of the airbag 20 described above, the same members are given the same reference numerals and the detailed description is not provided.

The slip member 43 used in the airbag 20A has a slip main body 44 and a margin 51 being formed extending forward from the front edge of the slip main body 44. The slip main body 44 has substantially the same external shape as the slip member 34 of the airbag 20 described above. That is, the slip main body 44, similar to the slip member 34 described above, widely covers the outer surface of the front area 27b from the portion of the center 27a, in the occupant side wall 27. In detail, the slip main body 44, similar to the slip member 34 described above, has a substantially trapezoidal shape with the bottom as the front edge decreasing in width rearward, in the external shape when being extended flat. The slip main body 44, similar to the slip main body 34 described above, has a front portion 45 and a rear portion 46. The front portion 45 is a portion covering the outer surface of the front area 27b of the occupant side wall 27. The rear portion 46 is a portion extending across the rear area 27c of the occupant side wall 27 from the rear edge of the front portion 45.

The slip main body 44, similar to the slip main body 34 described above, is sewn (connected) to the occupant side wall 27 by sewing threads at three positions of both left and right (lateral) edges and the side spaced apart from the head MH of the driver MD at one edge in the front-rear direction (longitudinal direction) substantially perpendicular to the left-right direction. That is, the slip member 44 is sewn to the occupant side wall 27 at three positions of the left edge 45a and the right edge 45b of the front portion 45, and the rear edge 46a of the rear portion 46. Further, in the slip main body 44, the left connecting portion 47 and the right connecting portion 48 for sewing the left edge 45a and the right edge 45b of the front portion 45 to the occupant side wall 27 is positioned ahead of the center 27a in the front-rear direction (longitudinal direction) of the occupant side wall 27 (occupant protection area PA). Further, in the slip main body 44, the rear connecting portion (edge connecting portion) 49 for sewing the rear edge 46a of the rear portion 46 to the occupant side wall 27 is positioned behind the center 27a in the front-rear direction (longitudinal direction) of the occupant side wall 27 (occupant protection area PA). Further, the slip main body 44, similar to the slip main body 34 described above, is symmetrical to the left and right, extended flat with the left-right center substantially matched with the left-right center of the airbag main body 21, and overlapped on the occupant side wall 27, and then is sewn to the occupant side wall 27. Further, the left-right width of the slip main body 44 of the slip member 43 is set slightly smaller than the left-right width of the slip member 34 described above.

The margin 51 is formed such that the front end extends in a substantially band shape, with the width gradually decreasing from the front edge 45c of the slip main body 44. Further, the margin 51 is provided to connect (sew) the portion near the front edge 51a to the portion near the front edge of the occupant side wall 27 in the airbag main body 21, at the portion of the front connecting portion 52. That is, the margin 51 is a portion disposed in an area before the left connecting portion 47 and the right connecting portion 48, in the slip member 43, when the airbag main body 21 has completely inflated. In detail, the margin 51 is formed to extend forward from the left-right center portion in the front edge 45c of the slip main body 44, in a band shape in the substantially front-rear direction, when being extended flat. The length L1 (the distance from the position corresponding to the front edge 45c of the slip main body 55 to the front connecting portion 52) of the margin 51 extended flat is set larger than the distance L2 from the position corresponding to the front edge 45c of the slip main body 44 to the front edge in the airbag main body 21. Further, the front edge 51a, which is the front end, of the margin 51 is sewn (connected) to the portion near the front edge of the occupant side wall 27, being loosed at the center portion (see FIG. 8). The portion where the front edge 51a of the margin 51 is sewn to the occupant side wall 27 forms the front connecting portion 52. The length L1 of the margin 51 is set to allow sliding to the airbag main body 21 when the airbag main body 21 comes in contact with the driver MD while being developed and inflated.

Figure 10:
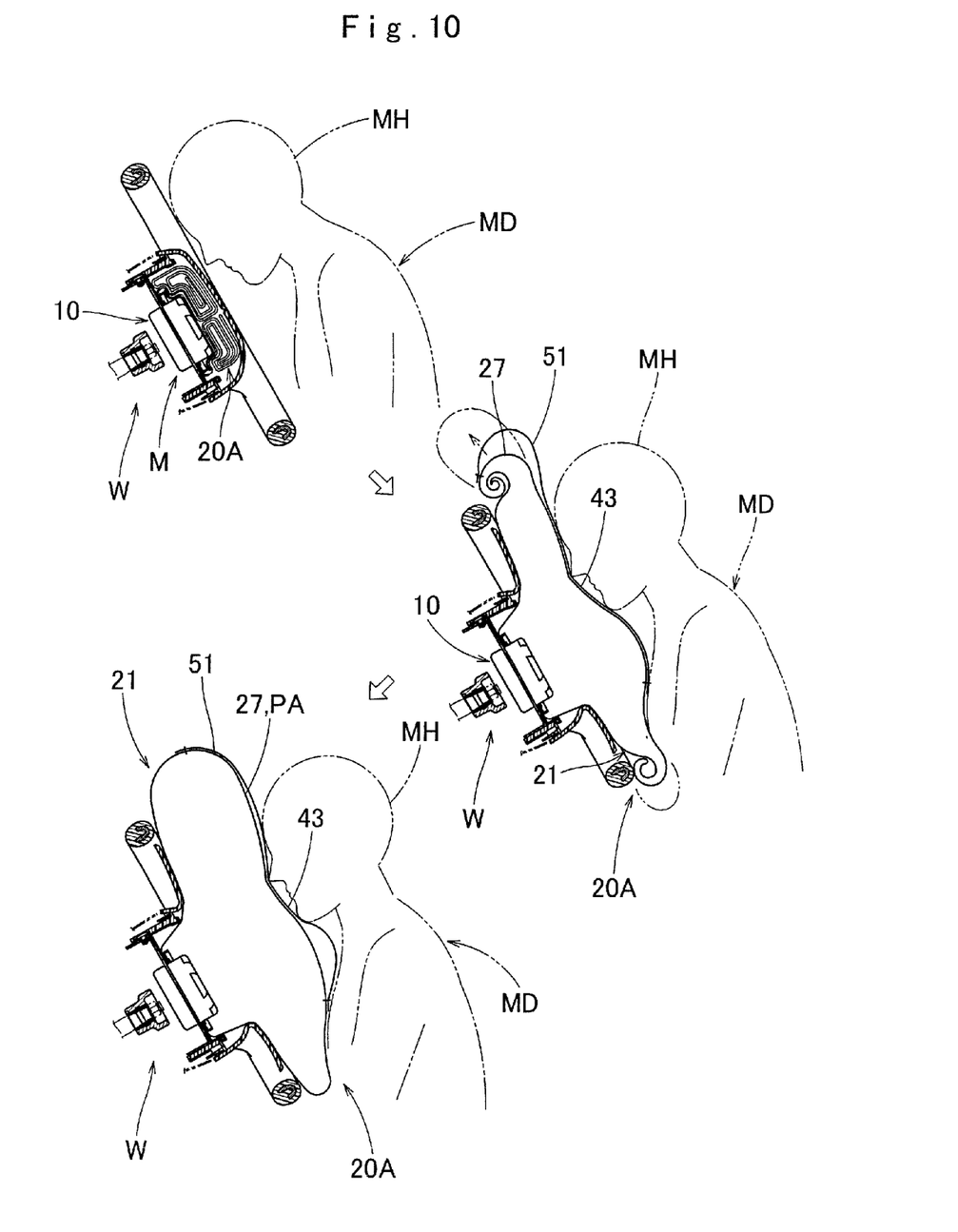
FIG. 10 is a schematic longitudinal cross-sectional view showing an inflating process of the airbag in the airbag apparatus using the airbag of FIG. 8, which is mounted in a vehicle.

When the airbag 20A having the configuration described above is used, since the slip member 43 is connected to the airbag main body 21 in front edge 45c corresponding to the head MH of the driver MD, an end edge of the slip member 43 which traverses to the left and right is not generated in the area of the front-upper edge in the occupant protection area PA (occupant side wall 27). Therefore, when the occupant side wall 27 receives the driver MD after the airbag main body 21 is completely inflated, it is possible to suppress the end edge of the slip member 43 from interfering with the driver MD. Further, in the airbag 20A having the configuration, the slip member 43 has the margin 51 extending from the front edge 45c of the slip main body 44 and the front edge 51a is connected to the airbag main body 21, with the margin 51 being loosed with respect to the airbag main body 21. Therefore, even if the airbag 20A having the configuration is used, the portion of the margin 51 positioned ahead of the head MH of the driver MD in the slip member 43 can be deviated from the airbag main body 21. As a result, as shown in FIG. 10, even though the head MH of the driver MD is received by the airbag 20A while the airbag main body 21 is developed and inflated, the airbag main body 21 can be developed to come out to the front against the slip member 43 being in contact with the head MH while suppressing the load against the head MH of the driver MD. Therefore, even in the airbag 20A having the configuration, it is possible to surely suppress the driver MD from being pushed up by the inflation of the airbag main body 21.

Figure 11:
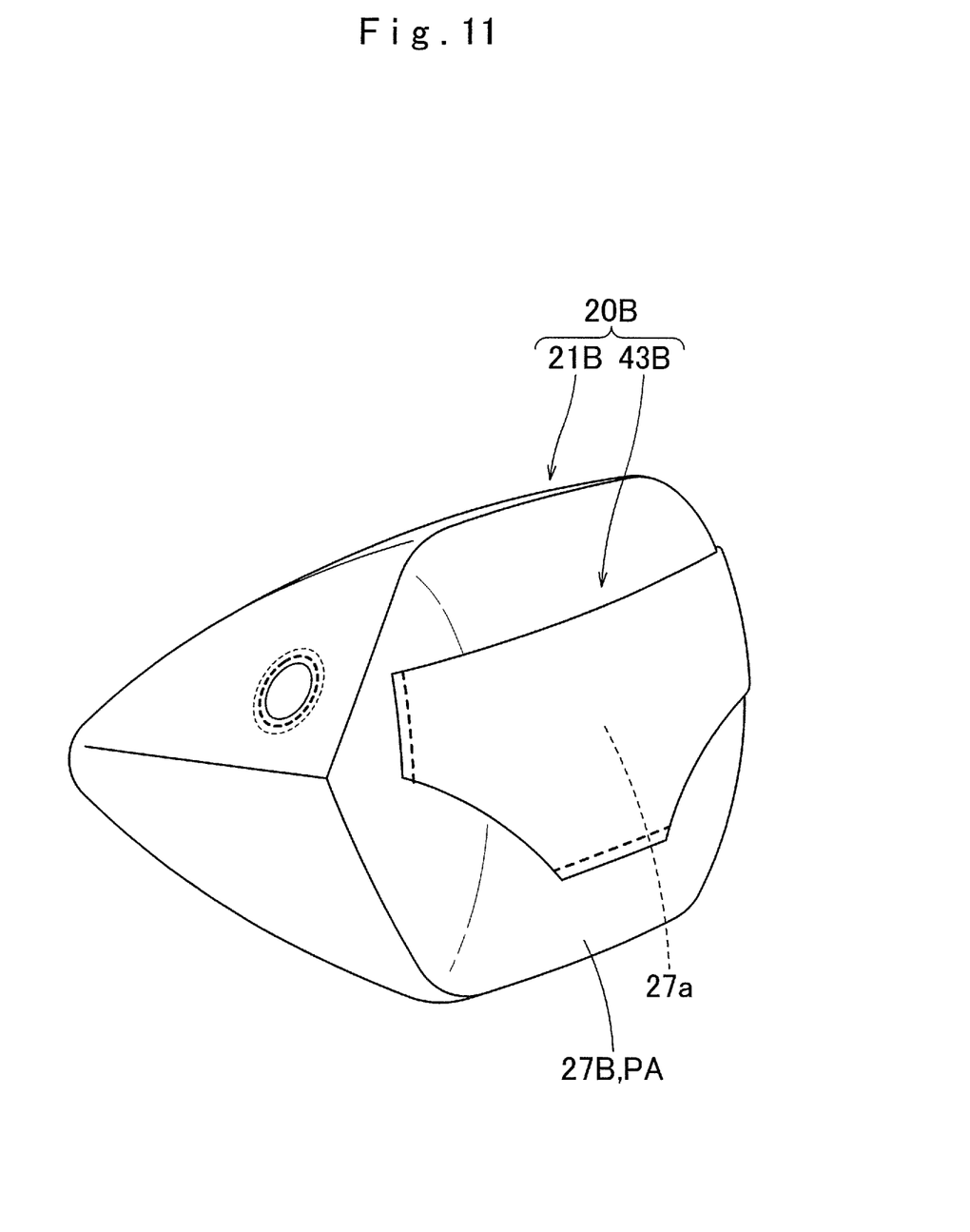
FIG. 11 is a schematic perspective view when an airbag according to still another embodiment of the present invention is inflated in a single unit.

Further, the embodiment exemplifies that the airbags 20 and 20A are used for an airbag apparatus for a steering wheel. However, as shown in FIG. 11, the present invention may be applied to an airbag 20B of an airbag apparatus for a passenger's seat, which is folded and received under the instrument panel disposed ahead of the passenger's seat. The airbag 20B includes an airbag main body 21B having a substantially four-sided pyramid shape with the top forward and a slip member 34B. The slip member 34B is disposed on the outer surface (rear surface) of a passenger (occupant) side wall 27B forming a passenger (occupant) protection area PA in the airbag main body 21B. The airbag main body 21B has a substantially four-sided pyramid shape with the bottom rearward and the top forward, when completely inflated. In the airbag main body 21B, the occupant side wall 27B disposed substantially in the up-down direction at the rear surface, when the airbag main body 21B is completely inflated, is the portion forming the occupant protection area PA. Further, the occupant side wall 27B is also bent and disposed such that the up-down center 27a protrudes the closest to the occupant (rearward), when the airbag main body 21B has finished inflating. When the present invention is applied to the airbag apparatus for a passenger's seat, it is also possible to suppress the passenger from being pushed up by the airbag main body when the airbag main body 21B comes in contact with the passenger while being developed and inflated, when the passenger is close to the instrument panel.

Further, in the embodiment, the slip member 34 is formed in a substantially trapezoidal shape, but the external shape of the slip member 34 is not limited thereto. The external shape of the slip member, for example, may be a substantially rectangular shape. In the embodiment, the slip member 34 is formed in a substantially trapezoidal shape with the surplus part removed. Further, the slip member 34 is not only connected to the airbag main body 21 by a sewing thread, but may be bonded by an adhesive.

Further, the materials of the slip members 34 and 43 are not limited to those in the embodiment. The material of the slip member may be a flexible sheet material, and for example, may be a nonwoven fabric or a film material made of synthetic resin. However, in the airbags 20 and 20A of the embodiment, the slip members 34 and 43 are made of a sheet material having low friction resistance against the base fabric for forming the airbag main bodies 21 and 21A. Therefore, when coming in contact with the driver MD, the sliding performance of the slip members 34 and 43 against the airbag main bodies 21 and 21A can be more improved and the load applied to the driver MD from the airbag main body 21 can be considerably suppressed.

What is claimed is:

1. An airbag apparatus comprising:
   an airbag that is folded and received in a receiving part; and
   an inflator that supplies an inflation gas into the airbag,
   wherein the airbag inflates to protect the upper half of a occupant's body sitting on a seat while being developed and inflated to protrude from the receiving part by an inflation gas discharged from an inflator and flowed into the airbag,
   the airbag includes a flexible airbag main body having a bag form and a slip member disposed on the outer surface of an occupant protection area for protecting the occupant in the airbag main body, when completely inflated,
   the slip member is made of a flexible sheet material that suppresses load applied to the occupant from the airbag main body to allow the airbag main body to slip when the airbag main body comes in contact with the occupant while being developed and inflated,
   the slip member is connected to the airbag main body at least three positions of both left and right edges, which are both lateral edges, and a rear-lower edge spaced apart from the head of the occupant at one edge in the longitudinal direction substantially perpendicular to the lateral direction, when the airbag main body has completely inflated,
   both of the left and right edges of the slip member are connected to the airbag main body by left and right connecting portions,
   the left connecting portion and the right connecting portion are positioned before and above the longitudinal center of the occupant protection area,
   the rear-lower edge of the slip member is connected to the airbag main body by a rear connecting portion, and the rear connecting portion is positioned rear-lower the longitudinal center of the occupant protection area.

2. The airbag apparatus according to claim 1, wherein the slip member has a margin in an area before and above the left connecting portion and the right connecting portion when the airbag main body has completely inflated, and
   the margin is connected to the airbag main body at the front and upper edge while being loosed with respect to the airbag main body to be slidable to the airbag main body when coming in contact with the occupant.

3. The airbag apparatus according to claim 1, wherein the airbag is for a steering wheel, and
   the airbag main body has an occupant side wall that is disposed at the occupant side and forms the occupant protection area when the airbag main body is completely inflated, and a vehicle body side wall that is disposed at the steering wheel side when the airbag main body is completely inflated, in which the occupant side wall and the vehicle body side wall have the same external shape, which is a substantially circular shape, and the outer circumferential edges of the occupant side wall and the vehicle body side wall are connected.

4. The airbag apparatus according to claim 1, wherein the slip member is made of a sheet material having small friction resistance against the fabric of the airbag main body.

* * * * *